(12) United States Patent
Johnson et al.

(10) Patent No.: US 6,170,798 B1
(45) Date of Patent: Jan. 9, 2001

(54) FLUID DETECTION AND SHUTOFF ACTUATION APPARATUS RETROFITABLE ON FLUID SHUTOFF VALVE

(76) Inventors: Chris C. Johnson, 3214 Wedgewood Dr.; Charles A. Wende, 2124 Zanzibar, both of El Paso, TX (US) 79925

(*) Notice: Under 35 U.S.C. 154(b), the term of this patent shall be extended for 0 days.

(21) Appl. No.: 09/409,769

(22) Filed: Sep. 30, 1999

Related U.S. Application Data (60) Provisional application No. 60/118,459, filed on Feb. 3, 1999.

(51) Int. Cl.[7] .................................................. F16K 17/36
(52) U.S. Cl. .......................... 251/68; 137/78.1; 137/312
(58) Field of Search ................................ 137/78.1, 312; 251/68

(56) References Cited

U.S. PATENT DOCUMENTS

| | | | |
|---|---|---|---|
| 3,024,372 | 3/1962 | Seele | 307/118 |
| 3,488,000 | 1/1970 | Cramer | 239/63 |
| 3,553,481 | 1/1971 | Hasenbeck | 307/118 |
| 3,847,351 | 11/1974 | Hasenbeck | 239/63 |
| 3,874,403 | 4/1975 | Fischer | 137/386 |
| 4,055,200 | 10/1977 | Lohoff | 137/624.11 |
| 4,114,647 | 9/1978 | Sturman et al. | 137/624.2 |
| 4,216,789 | 8/1980 | Hasenbeck | 137/78 D |
| 4,253,606 | 3/1981 | Johnson | 239/63 |
| 4,297,686 | 10/1981 | Tom | 340/604 |
| 4,324,268 | 4/1982 | Jacobson | 137/312 |
| 4,684,920 | 8/1987 | Reiter | 340/310 A |
| 5,188,143 | 2/1993 | Krebs | 137/312 |
| 5,240,022 | 8/1993 | Franklin | 137/1 |
| 5,632,302 | * 5/1997 | Lenoir | 137/312 |
| 5,713,387 | * 2/1998 | Armenia et al. | 137/312 |
| 5,771,916 | * 6/1998 | Armenia et al. | 137/312 X |
| 5,966,076 | * 10/1999 | Cantrell | 137/312 X |

\* cited by examiner

*Primary Examiner*—Gerald A. Michalsky
(74) *Attorney, Agent, or Firm*—Flanagan & Flanagan; John R. Flanagan; John K. Flanagan (57) ABSTRACT

A fluid detection and shutoff actuation apparatus includes a rotatable plate mountable over a shaft of a shutoff valve, a linear actuator spaced from the plate, a trigger disposed between the actuator and plate, a fluid detector, and a control mechanism connecting the fluid detector to the actuator for activating it in response to detection of a fluid at a location monitored by the detector. The actuator is movable between extended and retracted positions toward and away from the plate. The plate rotates with the shaft between first and second positions in which the shutoff valve is respectively in opened and closed conditions and the plate is biased by a coil spring to rotate from the first to second position and change the valve from the opened to closed condition. The trigger is connected to the actuator and is pivotally movable toward and away from the plate in respond to movement of the actuator between the extended and retracted positions. As the actuator is moved toward and away from the trigger between the extended and retracted positions and the trigger therewith is pivotally moved toward and away from the plate, the plate correspondingly is prevented from rotating and thereby retains the value in the opened condition and is allowed to rotate such that the valve is changed from the opened to closed condition.

20 Claims, 4 Drawing Sheets

FLUID DETECTION AND SHUTOFF ACTUATION APPARATUS RETROFITABLE ON FLUID SHUTOFF VALVE

This application claims the benefit of provisional application Ser. No. 60/118,459, filed Feb. 3, 1999.

BACKGROUND OF THE INVENTION

1. Field of the Invention

The present invention generally relates to devices for detecting the presence of fluids, such as water, and, more particularly, is concerned with a fluid detection and shutoff actuation apparatus retro fitable on an existing fluid shutoff valve.

2. Description of the Prior Art

Water may leak from a defective portion of a water line or from malfunctioning appliances or fixtures connected to the water line that are disposed within a building. Such leaks typically will cause considerable damage to walls, floors and ceilings of the building as well as to furnishings inside the building. It would be desirable to be able to detect the presence of water at any of a variety of locations where such leaks may occur. It further would be desirable to have a mechanism by which the passage of water through the water line may be stopped upon detection of the presence of water at certain locations.

Various devices have been developed over the years which provide detection systems. Representative examples of such prior art detection devices and the like are disclosed in U.S. Pat. No. 3,024,372 to Seele, U.S. Pat. No. 3,488,000 to Cramer, U.S. Pat. Nos. 3,553,481, 3,847,351 and 4,216,789 to Hasenbeck, U.S. Pat. No. 3,874,403 to Fischer, U.S. Pat. No. 4,055,200 to Lohoff, U.S. Pat. No. 4,114,647 to Sturman et al., U.S. Pat. No. 4,253,606 to Johnson, U.S. Pat. No. 4,297,686 to Tom, U.S. Pat. No. 4,324,268 to Jacobson, U.S. Pat. No. 4,684,920 to Reiter, U.S. Pat. No. 4,805,562 to Davis et al., U.S. Pat. No. 5,188,143 to Krebs and U.S. Pat. No. 5,240,022 to Franklin. The Franklin patent, in particular, discloses a device which closes a valve ball when liquid, such as water, is detected by one or more sensors. While the prior art Franklin device may be satisfactory in use for the specific purpose for which it was designed, its installment would seem to require replacement and/or modification of an existing water shutoff valve and thus its use would be costly since it appears not to be retrofitable to an existing ball-type shutoff valve.

Consequently, a need remains for an innovation which will provide a more optimum solution to the aforementioned problems in the prior art without introducing any new problems in place thereof.

SUMMARY OF THE INVENTION

The present invention provides a fluid detection and shutoff actuation apparatus which is designed to satisfy the aforementioned need. The fluid detection and shutoff actuation apparatus of the present invention does not require replacement of an existing fluid shutoff valve and is retrofitable on such existing valve and relatively easy to install. Such capabilities of the fluid detection and shutoff actuation apparatus provide a substantially more cost-effective solution to the aforementioned problem in the prior art.

Accordingly, the present invention is directed to a fluid detection and shutoff actuation apparatus which comprises a rotatable plate mountable over a shaft of a shutoff valve, a linear actuator spaced from the plate, a trigger member disposed between the actuator and the plate, a fluid detector means disposed at a location or locations to be monitored, and a control mechanism connecting the fluid detector means to the actuator for activating the actuator in response to detection of fluid by the detector. The actuator is movable linearly between extended and retracted positions toward and away from the plate. The plate rotates with the shaft between first and second positions causing the shutoff valve to be respectively changed between opened and closed conditions. Biasing means imposes a biasing force on the plate so as to bias the plate to rotate from the first to second position and change the valve from the opened to closed condition. The plate has a protrusion extending outwardly from a peripheral edge thereof. The trigger member is connected to the actuator and is pivotally movable toward and away from the plate in respond to movement of the actuator between the extended and retracted positions. The trigger member has a protuberance extending outwardly therefrom toward the plate such that, in response to the actuator being moved toward and away from the trigger member between the extended and retracted positions and the trigger member therewith being pivotally moved toward and away from the plate, the protuberance moves between a blocking position in which it engages the protrusion on the plate preventing rotation of the plate and thereby retaining the valve in the opened condition and an unblocking position away from the plate in which the protuberance is disengaged from the protrusion on the plate allowing the biased rotation of the plate such that the valve is changed from the opened to closed condition.

More particularly, the linear actuator has a movable plunger movable between the extended and retracted positions. The trigger member has a pair of opposite end portions and a middle portion extending between and interconnected with the opposite end portions. The trigger member is pivotally mountable at one opposite end portion about an axis and pivotally connected at the other opposite end portion to the movable plunger of the actuator. The protuberance is attached on the middle portion of the trigger member between the opposite end portions thereof.

The plate has a central hole defined therethrough for receiving the outer end of the shaft of the shutoff valve and a plurality of locations defined on and spaced radially outwardly from the central hole of the plate and spaced circumferentially from one another. A coil spring is provided for imposing the biasing force on the plate. The coil spring is placed about the outer end of the shaft and has a pair of opposite ends. The coil spring at one opposite end is attachable to a valve body of the valve and at the other opposite end is attachable to the plate at a selected one of the locations thereon for setting a desired magnitude of the biasing force applied to the plate. More specifically, the locations are apertures defined through the plate and the other opposite end of the coil spring is attached to the plate by a pin disposed through the selected one aperture. Further, the rotatable plate has a substantially flat and circular disc-shaped configuration and the coil spring is disposable between and generally parallel to the plate and valve body.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
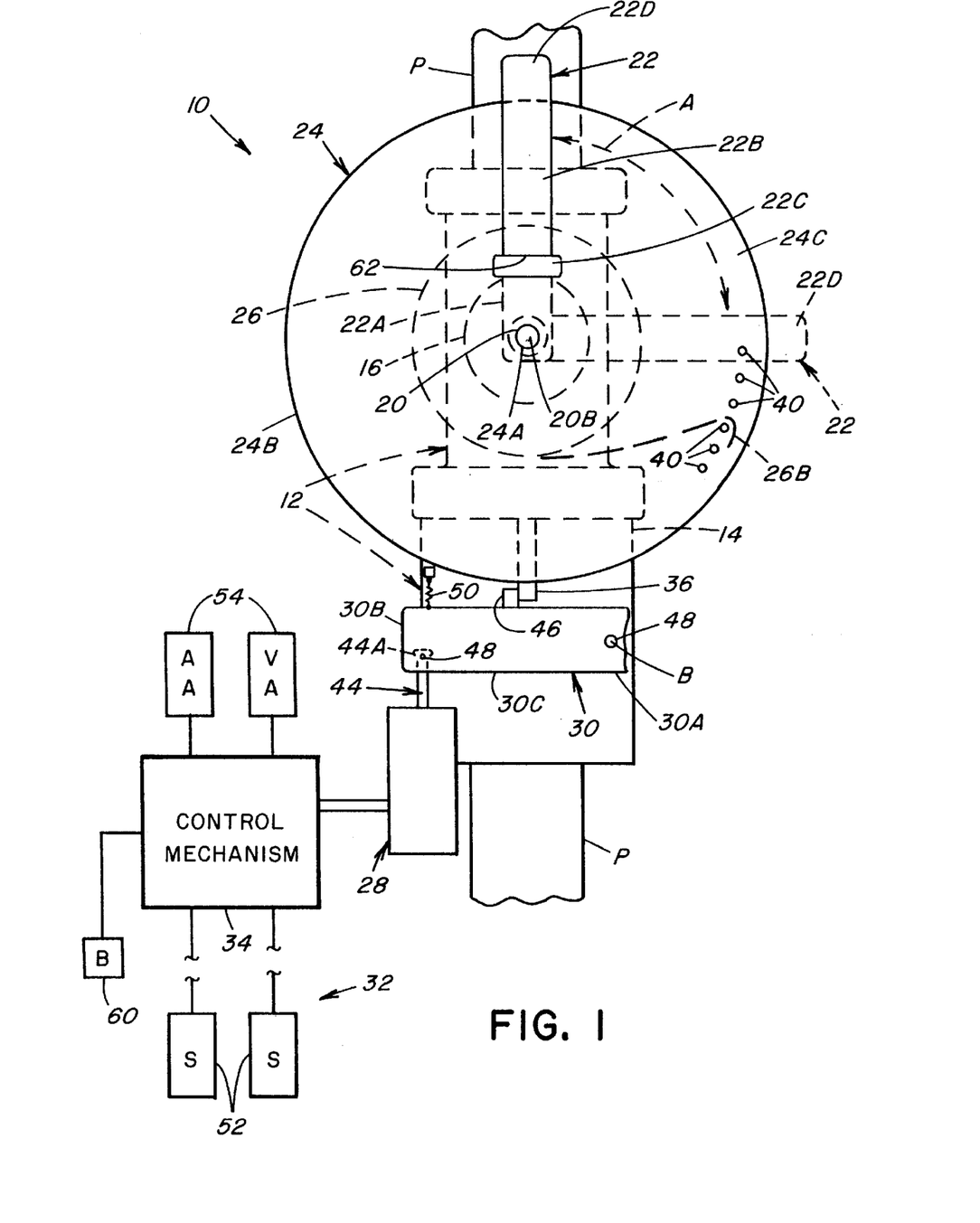
FIG. 1 is a top plan view of a fluid detection and shutoff actuation apparatus of the present invention mounted to a shutoff valve interposed in a fluid flow pipe.

Referring to the drawings and particularly to FIG. 1, there is illustrated a fluid detection and shutoff actuation apparatus, generally designated 10, of the present invention. The fluid detection and shutoff actuation apparatus 10 is shown used on an existing conventional fluid shutoff valve 12, such as a ball-type valve, on a fluid flow pipe P, such as a water flow pipe of a water line. The existing shutoff valve 12 includes a valve body 14, a ball-shaped valve element 16 rotatably mounted within the valve body 16 across an interior passageway 18 therethrough, a shaft 20 having an inner end 20A engaged with the valve element 16 and rotatably mounted by the valve body 14 and extending outwardly from the valve element 16 to an outer end 20A of the shaft 20 protruding outwardly from the valve body 14, and a handle 22 fixedly attached on the outer end 20A of the shaft 20. Manual turning of the handle 22 and therewith rotation of the shaft 20 in one direction rotates the valve element 16 to an opened condition whereas reverse turning of the handle 22 and rotation of the shaft 20 in an opposite direction rotates the valve element 16 to a closed condition. The valve element 16 in the opened condition allows the passage of a fluid, such as water, through the flow pipe P whereas the valve element 16 in the closed condition blocks the passage of the fluid through the flow pipe P. Further, the handle 22 has inner and outer end portions 22A, 22B offset from one another and a middle portion 22C disposed and connected between the inner and outer end portions 22A, 22B. The middle portion 22C is disposed at an angle relative to each of the inner and outer end portions 22A, 22B such that the middle portion 22C spaces the outer end portion 22B away from but in a substantially parallel relation to the inner end portion 22A.

Figure 2:
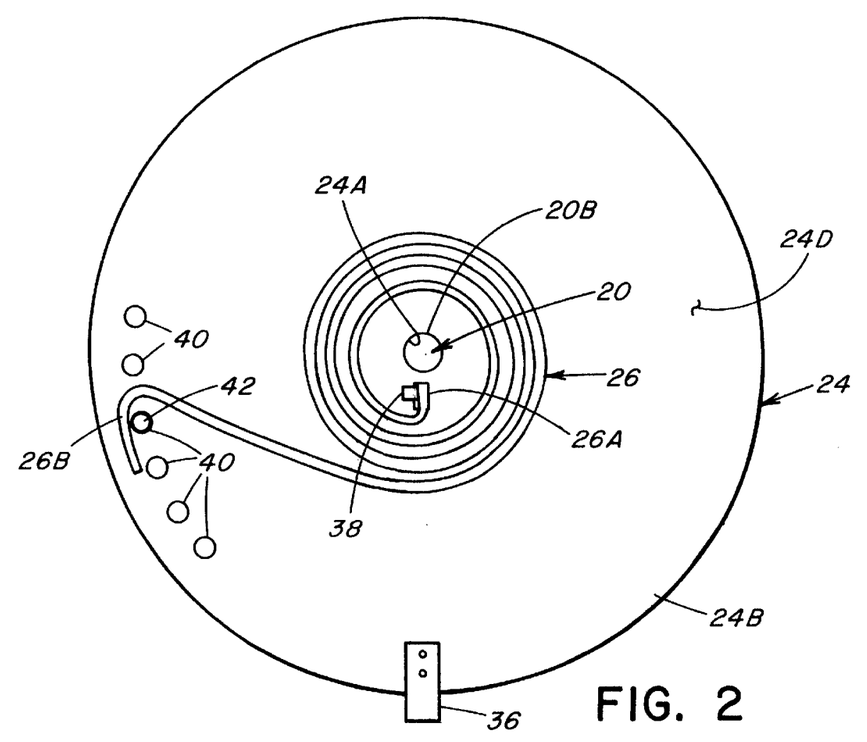
FIG. 2 is an enlarged bottom plan view of a rotatable plate and a coil spring of the apparatus of FIG. 1.
Figure 3:
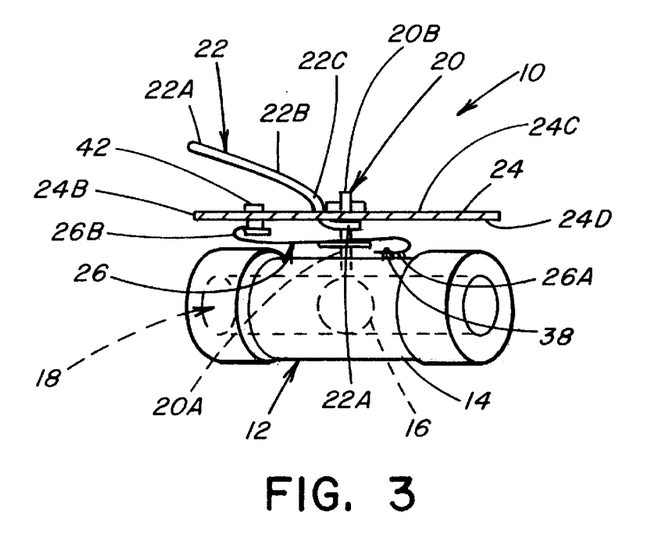
FIG. 3 is a side elevational view of the rotatable plate and coil spring of the apparatus of FIG. 1 but shown on a reduced scale.

Referring to FIGS. 1 to 3, the fluid detection and shutoff apparatus 10 basically includes a rotatable plate 24, a biasing means preferably in the form of a coil spring 26, a linear actuator 28, a trigger member 30, a fluid detector means 32, and a control mechanism 34. The rotatable plate 24 of the apparatus 10 has a substantially flat circular disc-shaped configuration and a central hole 24A by which the plate receives and thus is mountable over the outer end 20B of the shaft 20 of the shutoff valve 12 such that the plate 24 is disposed about and adjacent to the outer end 20B of the shaft 20. The plate 24 also has a peripheral edge 24B and a protrusion 36 in the form of a tooth fixedly attached on and extending outwardly from the peripheral edge 24B. The protrusion 36 may have a generally rectangular block-like configuration or any other suitable configuration.

The plate 24 is rotatable with the valve shaft 20 and handle 22 between a first position in which the shutoff valve 12 is placed in the open condition allowing passage of water through the passageway 18 of the valve body 14 and the flow pipe P and a second position in which the shutoff valve 12 is placed in the closed condition blocking passage of water through the passageway 18 of the valve body 14 and the flow pipe P. The angularly-displaced first and second positions of the plate 24 (and of the shaft 20 and handle 22 of the valve 12) are angularly displaced approximately ninety degrees from one another with the respective directions of rotational movement of the shaft 20, handle 22 and plate 24 being shown in FIG. 1 by a double-headed arcuate-shaped arrow A. When the handle 22 is disposed in a substantially parallel relationship to the flow pipe P and valve body 14 as shown in solid line form in FIG. 1, the plate 24 is in the first position and the valve element 16 is in the opened condition. When the handle 22 is disposed in a substantially perpendicular relationship to the flow pipe P and valve body 14 as shown in dashed-line form in FIG. 1, the plate 24 is in the second position and the valve element 16 is in the closed condition.

The plate 24 also is biased to rotate from the first to second position and change the valve element 16 from the opened to closed condition. As mentioned above, the biasing means of the apparatus 10 preferably takes the form of the coil spring 26. The coil spring 26 may be a conventional type of coil spring which is well-known per se as a clock spring. The coil spring 26 has a pair of inner and outer ends 26A, 26B and is disposed around the valve shaft 20 and between the valve body 14 and the rotatable plate 24, as best seen in FIG. 3. The coil spring 26 is connected at its inner end 26A to a stop 38 provided on the valve body 14 and at its outer end 26B to the plate 24. More particularly, the coil spring 26 is mounted at the outer end 26B at a selected one of a plurality of locations thereon in the form of apertures 40 through the plate 24 for setting the desired magnitude of the biasing force applied by the coil spring 26 to the plate 24, as shown in FIG. 2. The apertures 40 are spaced radially outward from the central opening 24A of the plate and circumferentially spaced apart from one another. The coil spring 26 is biased to expand and thereby move the plate 24 in a counterclockwise direction, as seen in FIG. 2, and a clockwise direction as seen in FIG. 1. As seen in FIG. 3, a pin 42 is disposed through a selected one of the apertures 40 so as to retain the outer end 26B of the coil spring 26 at the selected one of the locations 40 on the plate 24. The pin 42 extends downwardly below the plate 24 such that the outer end 26B of the coil spring 26 may hook around the pin 42 in order to secure the outer end 26B of the coil spring 26 thereto at the selected on location 40.

The linear actuator 28 of the apparatus 10 is preferably a solenoid-activated type of actuator and is spaced outwardly from the plate 24. The actuator 28 has a movable plunger 44 with an outer end 44A. The plunger 44 is movable between an extended position, as seen in solid line form in FIG. 1, and a retracted position, as seen in dashed line form in FIG. 1. The actuator 28 is disposed adjacent to the peripheral edge 24B of the plate 24 and is supported in any suitable manner such as upon the body 14 of the shutoff valve 12. The plunger 44 linearly reciprocates toward and away from the peripheral edge 24B of the plate 24 upon movement, respectively, of the plunger 44 between the extended and retracted positions.

The trigger member 30 of the apparatus 10 is disposed between the plate 24 and the linear actuator 28. The plunger 44 also is linearly movable toward and away from the trigger member 30 in moving between the aforementioned extended and retracted positions. The trigger member 30 is connected to the outer end 44A of the plunger 44 of the linear actuator 28 and pivotally moves toward and away from the plate 24 in response to the actuator 28 correspondingly being moved between the extended and retracted positions.

More particularly, the trigger member 30 can have opposite end portions 30A, 30B, a middle portion 30C disposed between and interconnected with the opposite end portions 30A, 30B, and a tab or protuberance 46 formed on and extending outwardly from the middle portion 30C. Each of the trigger member 30 and the protuberance 46 can have a substantially rectangular block-like configuration or any other suitable shape. The trigger member 30 is supported at the one opposite end portion 30A by the valve body 14 for undergoing pivotal movement about an axis B and is coupled at the other opposite end portion 30B to the outer end 44A of the plunger 44 of the actuator 28. A pair of pins 48 are provided for making the respective pivotal connections of the opposite end portions 30A, 30B with the valve body 14 and the outer end 44A of the plunger 44 of the actuator 28.

In response to reciprocal linear movement of the plunger 44 of the actuator 28 toward and away from the trigger member 30 between the extended and retracted positions and pivotal movement of the trigger member 30 therewith toward and away from the peripheral edge 24B of the plate 24, the protuberance 46 on the trigger member 30 moves between a blocking position, as seen in solid line form in FIG. 1, in which it engages the protrusion 36 on the plate 24 preventing rotation of the plate 24 and thereby retaining the valve 12 in the opened condition and an unblocking position away from the plate 24 in which the protuberance 46 is disengaged from the protrusion 36 allowing the biased rotation of the plate 24 such that the valve 12 is changed from the opened to closed condition. The protrusion 36 on the peripheral edge 24B of the plate 24 moves through an arc of approximately ninety degrees when the plate 24 moves between the first and second positions. When the plate 24 is in the first position, its protrusion 36 is disposed against and on the right side of the protuberance 46 of the trigger member 30 when viewed from above, as shown in FIG. 1. When the plate 24 is in the second position, its protrusion 36 is disposed about ninety degrees from the protuberance 46 along the peripheral edge 24B of the plate 24. The trigger member 30 is biased by a spring 50 to return to the protuberance 46 to the blocking position when the plunger 44 of the actuator 28 is allowed to return to its extended position. By a user gripping the outer end portion 22B of the handle 22 and turning the handle 22 counterclockwise from the dashed line to solid line position in FIG. 1, the plate 24 is moved from the second to first position and the valve 12 from the closed to opened position. Then, by the user operating the control mechanism 34 to cause the plunger 44 of the actuator 28 to move to the extended position the protuberance 46 of the trigger member 30 is brought into engagement with the protrusion 36 on the plate 24 and blocks movement of the protrusion 36 and rotation of the plate 24 to the second position and valve 12 to the opened position merely due to the bias imposed on the plate 24 by the coil spring 26.

Figure 4:
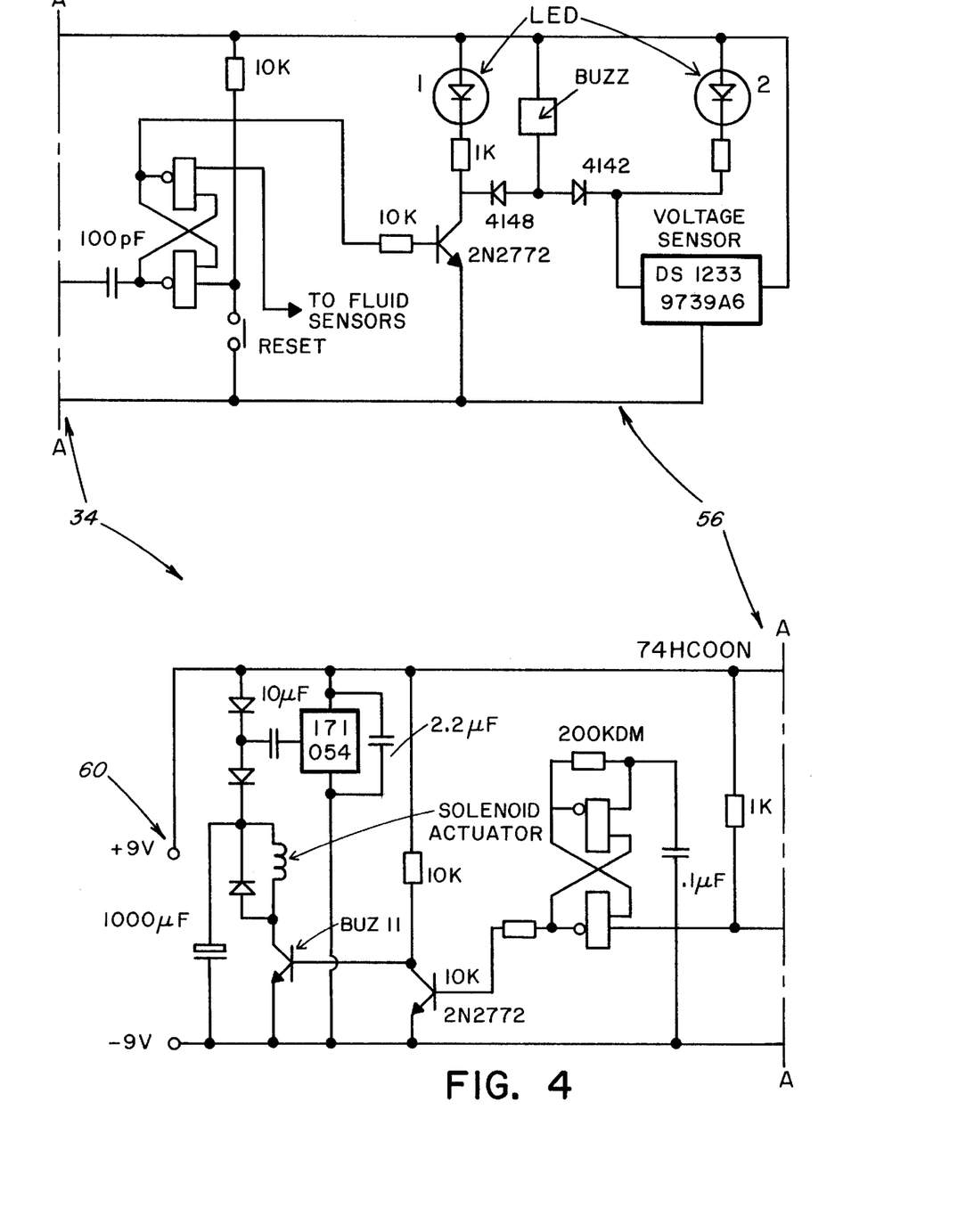
FIG. 4 is a schematic diagram of a first embodiment of a control mechanism of the apparatus.

Referring to FIGS. 1 and 4, the fluid detector means 32 of the apparatus 10 takes the form of one or more sensors 52 preferably being per se conventional types of sensors. The sensors 52 can be disposed at any desired different remote locations where monitoring for presence of fluid is desired, as represented in FIG. 1. Each sensor 52 has a predetermined electrical current flow therethrough. Each sensor 52 is used to monitor for the presence of the fluid, such as water, at a desired location remote from the shutoff valve 12 such that the presence of water causes a predetermined electrical current flow through the sensor 52 to change. The water may complete or increase the predetermined electrical current flow through the sensors 52. Each sensor 52 also may have different degrees of sensitivity to the presence of the fluid, that is to different quantities of the liquid, for placement in differing environmental conditions. Thus, the sensors 52 are intended to be placed remote from the rest of the apparatus 10 at locations where the monitoring and detection of the presence of fluids are desired.

The apparatus 10 also includes at least one and, preferably, a pair of alarms 54 for alerting the user of the presence of the fluid at the remote location(s) of one or more sensors 52. One of the alarms 54 is an audible alarm which sounds to alert the user. The other of the alarms 54 is a visible alarm which illuminates to alert the user. The audible and visible alarms 54 are per se conventional types of alarms. The audible and visible alarms 54 also may be connected so as to send a transmission to a monitored security system.

The control mechanism 34 of the apparatus 10 connects the fluid detector means 32 to the linear actuator 28 for activating the actuator 28 in response to detection of fluid at the location monitored by the fluid detector means 32. More particularly, the control mechanism 34 is electrically connected to the actuator 28, to the one or more sensors 52 and to the one or pair of alarms 54 such that upon the change in the predetermined electrical current flow through the one or more sensors 52, the control mechanism 34 causes the plunger 44 of the linear actuator 28 to move from the extended to the retracted position which results in movement of the trigger member 30 away from the plate 24 and the protuberance 46 to disengage from the protrusion 36 such that the plate 24 can now be moved by the biasing force of the coil spring 26 to the second position and the valve 12 moved to the closed condition to block passage of fluid through the valve 12 and flow pipe P. Concurrently, the control mechanism 34 causes the one or pair of alarms 54 to alert the user.

Figure 5:
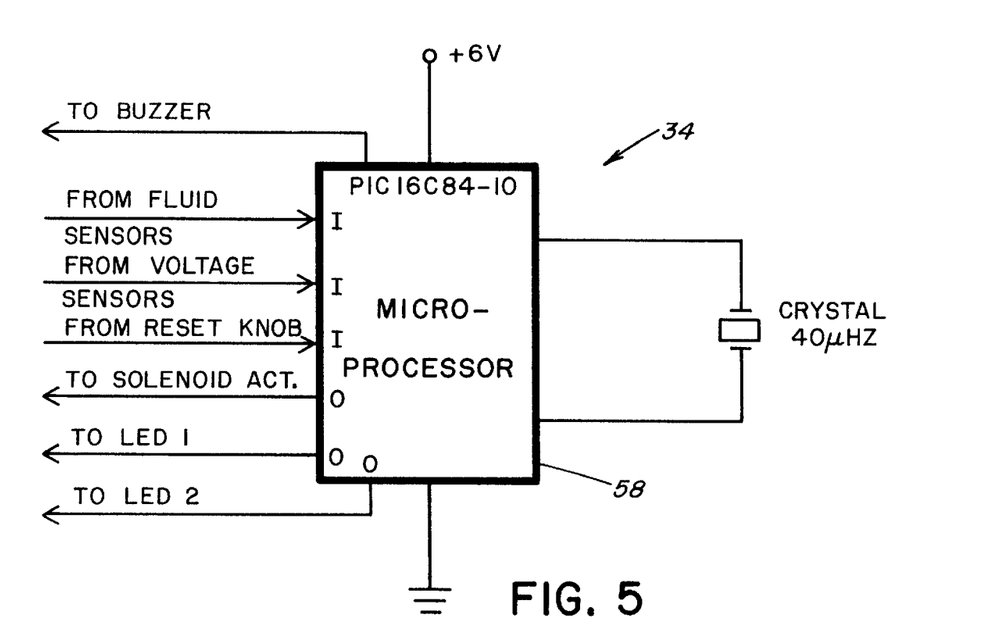
FIG. 5 is a block diagram of a second embodiment of the control mechanism of the apparatus.

The control mechanism 34 employs a circuit made up of various electrical and electronic components which are conventional per se. One exemplary embodiment of such circuit is shown in FIG. 4, for controlling and operating the linear actuator 28, the one or more sensors 52 and the one or pair of alarms 54. Another exemplary embodiment of such circuit is shown in FIG. 5 wherein the electrical and electronic components of FIG. 4 have been replaced by a programmable microprocessor 58. It is within the capability of a person of ordinary skill in the electronics or software art to program desired operations that are performed by various components of the apparatus 10 without the need to exercise an undue amount of experimentation to achieve such objective. In view that the present invention does not reside in the details of such operations performed by the control mechanism 34 it is believe to be unnecessary to describe such details herein in order to gain a complete and thorough understanding of the present invention.

A power source 60 of the apparatus 10 provides electrical power for operating the actuator 28, the sensors 52, the alarms 54 and the control mechanism 34. The power source 60 is at least one and, preferably, a plurality of DC batteries. The batteries 60 may number six or any other suitable number. By way of example, each battery 60 can have 1.5 volts and the six batteries all together can provide 9 volts of power. The batteries 60 power and allow for operation of the apparatus 10.

In operation, one or more of the sensors 52 detects the presence of a fluid at a desired location being monitored. The presence of the fluid either completes or increases electrical current flow through the sensor 52 to the control mechanism 34. In response to the completion or increase in electrical current flow to the control mechanism 34 at a predetermined level, the control mechanism 34 causes one or both of the audible and visible alarms 54 to sound and illuminate and also causes the plunger 44 of the linear actuator 28 to move from the extended position to the retracted position. Retraction of the plunger 44 results in disengagement of the protuberance 46 on the trigger member 30 from the protrusion 36 on the peripheral edge 24B of the plate 24 and thereby allows the plate 24 to rotate due to the biasing force imposed thereon by the coil spring 26 from the first to second position. Rotation of the plate 24 from the first to second position causes the valve 12 to move from the opened to closed condition. Movement of the valve 12 to the closed condition stops the flow of fluid, such as water, through the valve 12 and flow pipe P of a water line.

Furthermore, the rotatable plate 24 has opposite top and bottom surfaces 24C, 24D and a slot 62 defined through the plate 24 and extending between the opposite top and bottom surfaces 24C, 24D. The slot 62 is provided for receiving therethrough the middle portion 22C of the handle 22 attached to the shaft 20 of the valve 12. The inner end portion 22A of the handle 22 extends from the slot 62 along the bottom surface 24D of the plate 24 to the shaft 20 while the outer end portion 22B of the handle 22 extends from the slot 62 along the top surface 24C of the plate 24 to an outer free end 22D of the handle 22 spaced outwardly from the top surface 24C of the plate 24 for facilitating a user to grip the handle 22 in order to overcome the biasing force of the coil spring 26 and turn the handle 22 and therewith rotate the plate 24 from the second to first position and change the valve 12 from the closed to opened condition.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A fluid detection and shutoff actuation apparatus, comprising:
   (a) a rotatable plate having a peripheral edge and a protrusion attached on and extending outwardly from said peripheral edge, said plate being mountable over an outer end of a shaft of a shutoff valve for undergoing rotation with the shaft between a first position of said rotatable member in which the valve is placed in an opened condition and a second position of said rotatable member in which the valve is placed in a closed condition;
   (b) means for imposing a biasing force on said rotatable plate so as to bias said plate to undergo rotation from said first to second position and therewith change the valve from the opened to closed condition;
   (c) a linear actuator mountable in a spaced relationship from said plate and having a movable plunger movable reciprocably and linearly between an extended position toward and a retracted position away from said plate;
   (d) a trigger member mountable adjacent to and between said actuator and rotatable plate and connected to said movable plunger of said actuator for undergoing pivotal movement toward and away from said plate as said movable plunger is correspondingly moved between said extended and retracted positions, said trigger member having a protuberance thereon extending outwardly toward said plate such that, in response to reciprocal linear movement of said movable plunger of said actuator toward and away from said trigger member between said extended and retracted positions and pivotal movement of said trigger member therewith toward and away from said plate, said protuberance on said trigger member is moved between a blocking position adjacent to said plate in which said protuberance is engaged with said protrusion on said plate preventing rotation of said plate and thereby retaining said plate in said first position and the valve in the opened condition and an unblocking position away from said plate in which said protuberance on said trigger member is disengaged from said protrusion on said plate allowing rotation of said plate such that said biasing force can rotate said plate from said first to second position and therewith change the valve from the opened to closed condition;
   (e) fluid detector means for sensing presence or absence of a fluid at a location being monitored; and
   (f) a control mechanism for controlling operation of said actuator in response to said fluid detector means sensing the presence or absence of the fluid at the location being monitored such that said control mechanism prevents activation of said actuator and thus movement of said movable plunger thereof from said extended to retracted position in response to sensing the absence of fluid and causes activation of said actuator and thus movement of said movable plunger thereof from said extended to retracted position in response to sensing the presence of the fluid which correspondingly results in movement of said protuberance of said trigger member from said blocking to unblocking position and rotation of said rotatable member from said second to first position and changing of the valve from the opened to closed condition.

2. The apparatus of claim 1 wherein said trigger member has a pair of opposite end portions and a middle portion extending between and interconnected with said opposite end portions, said trigger member being pivotally mountable at one of said opposite end portions thereof about an axis and pivotally connected at the other of said opposite end portions thereof to said movable plunger of said actuator.

3. The apparatus of claim 2 wherein said protuberance is attached on said middle portion of said trigger member between said opposite end portions thereof.

4. The apparatus of claim 1 wherein said rotatable plate having a central hole defined therethrough for receiving therethrough the outer end of the shaft of the valve and a plurality of locations defined on said plate and spaced radially outwardly from said central hole thereof and spaced circumferentially from one another.

5. The apparatus of claim 4 wherein said means for imposing said biasing force on said rotatable plate is a coil spring placeable about the outer end of the shaft and having a pair of opposite ends, said coil spring at one of said opposite ends being attachable to a valve body of the valve and at the other of said opposite ends thereof being attachable to said plate at a selected one of said locations thereon for setting a desired magnitude of said biasing force applied by said coil spring to said rotatable plate.

6. The apparatus of claim 5 wherein said rotatable plate has a substantially flat and circular disc-shaped configuration and said coil spring is disposed generally parallel to said plate.

7. The apparatus of claim 5 wherein said locations on said rotatable plate are apertures defined through said plate and said other of said opposite ends of said coil spring is attached to said plate by a pin disposed through a selected one of said apertures.

8. The apparatus of claim 4 wherein said rotatable plate has opposite top and bottom surfaces and a slot defined through said plate and extending between said opposite top and bottom surfaces for receiving through said slot a handle attached to the shaft of the valve and extending therefrom along said bottom surface of said plate through said slot thereof to along said top surface thereof to an outer free end of the handle being spaced outwardly from said top surface of said plate for facilitating a user to grip the handle in order to overcome said biasing force of said coil spring and turn the handle and therewith rotate said plate from said second to first position and change the valve from the closed to opened condition.

9. A fluid detection and shutoff actuation apparatus, comprising:
   (a) a rotatable plate having a central hole, a peripheral edge spaced outwardly from and surrounding said central hole and a protrusion attached on and extending outwardly from said peripheral edge, said plate being mountable at said central hole over an outer end of a shaft of a shutoff valve for undergoing rotation with the shaft between a first position in which the valve is placed in an opened condition and a second position in which the valve is placed in a closed condition, said plate also having a plurality of locations defined thereon and spaced radially outwardly from said central hole and circumferentially from one another;
   (b) a coil spring for imposing a biasing force upon said rotatable plate so as to bias said plate to undergo rotation from said first to second position and therewith change the valve from the opened to closed condition, said coil spring being placeable about the outer end of the shaft of the valve and having a pair of opposite ends, said coil spring at one of said opposite ends being attachable to a valve body of the valve and at the other of said opposite ends thereof being attachable to said plate at a selected one of said locations thereon for setting a desired magnitude of said biasing force applied by said coil spring to said plate;
   (c) a linear solenoid-activated actuator mountable in a spaced relationship from said periphery of said plate and being movable between an extended position toward and a retracted position away from said periphery of said plate;
   (d) a trigger member mountable adjacent to and between said actuator and said peripheral edge of said plate and connected to said actuator for undergoing pivotal movement toward and away from said peripheral edge of said plate as said actuator is correspondingly moved between said extended and retracted positions, said trigger member having a protuberance thereon extending outwardly toward said peripheral edge of said plate such that, in response to said actuator being moved toward and away from said trigger member between said extended and retracted positions and said trigger member therewith being pivotally moved toward and away from said peripheral edge of said plate, said protuberance on said trigger member is moved between a blocking position adjacent to said peripheral edge of said plate in which said protuberance is engaged with said protrusion on said peripheral edge of said plate preventing rotation of said plate and thereby retaining said plate in said first position and the valve in the opened condition and an unblocking position away from said periphery of said plate in which said protuberance is disengaged from said protrusion on said peripheral edge of said plate allowing rotation of said plate such that said biasing force of said spring can rotate said plate from said first to second position and therewith change the valve from the opened to closed condition;
   (e) fluid detector means for sensing presence or absence of a fluid at a location being monitored; and
   (f) a control mechanism for controlling operation of said actuator in response to said fluid detector means sensing the presence or absence of the fluid at the location being monitored such that said control mechanism prevents activation of said actuator and thus movement thereof from said extended to retracted position in response to sensing the absence of fluid and causes activation of said actuator and thus movement thereof from said extended to retracted position in response to sensing the presence of fluid which correspondingly results in movement of said protuberance of said trigger member from said blocking to unblocking position and rotation of said plate from said second to first position and changing of the valve from the opened to closed condition.

10. The apparatus of claim 9 wherein said trigger member has a pair of opposite end portions and a middle portion extending between and interconnected with said opposite end portions, said trigger member being pivotally mountable at one of said opposite end portions thereof about an axis and pivotally connected at the other of said opposite end portions thereof to said movable plunger of said actuator.

11. The apparatus of claim 10 wherein said protuberance is attached on said middle portion of said trigger member between said opposite end portions thereof.

12. The apparatus of claim 9 wherein said rotatable plate has opposite top and bottom surfaces and a slot defined through said plate and extending between said opposite top and bottom surfaces for receiving through said slot a handle attached to the shaft of the valve and extending therefrom along said bottom surface of said plate through said slot thereof to along said top surface thereof to an outer free end of the handle being spaced outwardly from said top surface of said plate for facilitating a user to grip the handle in order to overcome said biasing force of said coil spring and turn the handle and therewith rotate said plate from said second to first position and change the valve from the closed to opened condition.

13. The apparatus of claim 9 wherein said rotatable plate has a substantially flat and circular disc-shaped configuration.

14. A fluid detection and shutoff apparatus, comprising:
   (a) a shutoff valve including
      (i) a valve body,
      (ii) a ball-shaped valve element rotatably mounted in said valve body,
      (iii) a shaft having an inner end engaged with said valve element and rotatably mounted to said valve body and extending outwardly from said valve element to an outer end of said shaft protruding outwardly from said valve body, and
      (iv) a handle attached on said outer end of said shaft such that turning of said handle and therewith rotation of said shaft in one direction rotates said valve element to an opened condition whereas reverse turning of said handle and rotation of said shaft in an opposite direction rotates said valve element to a closed condition, said handle having inner and outer end portions offset from one another and from said valve body and a middle portion disposed between and interconnecting said inner and outer end portions such that said middle portion is disposed at an angle relative to each of said inner and outer end portions and spaces said outer end portion away from but in a substantially parallel relation to said inner end portion and said valve body; and (b) a fluid detection and shutoff actuation arrangement including (i) a rotatable plate having a peripheral edge and a protrusion attached on and extending outwardly from said peripheral edge, said plate being mountable over said outer end of said shaft of said shutoff valve for undergoing rotation with said shaft between a first position of said plate in which said valve element is placed in said opened condition and a second position in which said valve element is placed in said closed condition;

(ii) a coil spring for imposing a biasing force upon said rotatable plate so as to bias said plate to undergo rotation from said first to second position and therewith change said valve element from said opened to closed condition;

(iii) a linear actuator mountable in a spaced relationship outwardly from said peripheral edge of said rotatable plate and having a movable plunger reciprocably and linearly movable between an extended position toward and a retracted position away from said peripheral edge of said plate;

(iv) a trigger member mountable adjacent to and between said actuator and said peripheral edge of said plate and connected to said movable plunger of said actuator so as to undergo pivotal movement toward and away from said peripheral edge of said plate as said movable plunger is correspondingly moved between said extended and retracted positions, said trigger member having a protuberance extending outwardly toward said peripheral edge of said plate such that, in response to said movable plunger of said actuator being reciprocally and linearly moved toward and away from said trigger member between said extended and retracted positions and said trigger member therewith pivotally moved toward and away from said peripheral edge of said plate, said protuberance on said trigger member is moved between a blocking position adjacent to said peripheral edge of said plate in which said protuberance is engaged with said protrusion on said plate preventing rotation of said plate and thereby retaining said plate in said first position and said valve element in said opened condition and an unblocking position away from said periphery of said plate in which said protuberance is disengaged from said protrusion on said plate allowing rotation of said plate such that said biasing force can rotate said plate from said first to second position and therewith change said valve element from said opened to closed condition, (v) fluid detector means for sensing presence or absence of a fluid at a location being monitored; and (vi) a control mechanism for controlling operation of said actuator in response to said fluid detector means sensing the presence or absence of the fluid at said location being monitored such that said control mechanism prevents activation of said actuator and thus movement of said movable plunger from said extended to retracted position in response to sensing the absence of fluid and causes activation of said actuator and thus movement of said movable plunger from said extended to retracted position in response to sensing the presence of fluid which correspondingly results in movement of said protuberance of said trigger member from said blocking to unblocking position and rotation of said plate from said second to first position and changing of said valve element from said opened to closed condition.

15. The apparatus of claim 14 wherein said rotatable plate has a substantially flat and circular disc-shaped configuration.

16. The apparatus of claim 14 wherein said rotatable plate having a central hole defined therethrough for receiving through said central hole said outer end of said shaft of said shutoff valve and a plurality of locations defined thereon and spaced radially outwardly from said central hole and spaced circumferentially apart from one another.

17. The apparatus of claim 16 wherein said means for imposing said biasing force is a coil spring placed about said outer end of said shaft and having a pair of opposite ends, said coil spring at one of said opposite ends being attached to said valve body of said shutoff valve and at the other of said opposite ends thereof being attached to said plate at a selected one of said locations thereon for setting a desired magnitude of said biasing force applied by said coil spring to said plate.

18. The apparatus of claim 17 wherein:
said rotatable plate has a substantially flat and circular disc-shaped configuration; and
said coil spring surrounds said outer end of said shaft and is disposed generally parallel to said plate and said valve body.

19. The apparatus of claim 17 wherein said locations are apertures defined through said plate and said other of said opposite ends of said coil spring is attached to said plate by a pin disposed through a selected one of said apertures.

20. The apparatus of claim 14 wherein said rotatable plate has opposite top and bottom surfaces and a slot defined through said plate and extending between said opposite top and bottom surfaces for receiving through said slot said handle at said middle portion thereof such that said inner end portion of said handle extends from said shaft along said bottom surface of said plate to said slot therein and said outer end portion of said handle extends from said slot in said plate along said top surface thereof to an outer free end of the handle being spaced outwardly from said top surface of said plate for facilitating a user to grip said handle in order to overcome said biasing force of said coil spring and turn said handle and therewith rotate said plate from said second to first position and change said valve element from said closed to opened condition.

* * * * *